United States Patent
Konji

(10) Patent No.: US 8,767,227 B2
(45) Date of Patent: Jul. 1, 2014

(54) STORAGE MEDIUM FOR PRINTER DRIVER PROGRAM, PRINT CONTROL APPARATUS, AND METHOD FOR CONTROLLING SAME

(75) Inventor: Mitsuru Konji, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 22 days.

(21) Appl. No.: 13/396,380

(22) Filed: Feb. 14, 2012

(65) Prior Publication Data

US 2012/0218581 A1 Aug. 30, 2012

(30) Foreign Application Priority Data

Feb. 24, 2011 (JP) .................................. 2011-038353

(51) Int. Cl.
- G06F 3/12 (2006.01)
- G06K 15/00 (2006.01)
- G06F 15/167 (2006.01)
- G06F 15/177 (2006.01)

(52) U.S. Cl.
USPC ........ 358/1.13; 358/1.14; 358/1.15; 709/213; 709/221

(58) Field of Classification Search
None
See application file for complete search history.

(56) References Cited

U.S. PATENT DOCUMENTS

| | | | | |
|---|---|---|---|---|
| 6,963,412 | B1 * | 11/2005 | Toda | 358/1.13 |
| 2002/0120742 | A1 * | 8/2002 | Cherry | 709/226 |
| 2005/0190399 | A1 * | 9/2005 | Nakaoka et al. | 358/1.15 |

FOREIGN PATENT DOCUMENTS

| | | |
|---|---|---|
| JP | 2001-071602 A | 3/2001 |
| JP | 2004-171050 A | 6/2004 |

* cited by examiner

*Primary Examiner* — Firmin Backer
*Assistant Examiner* — Henok A Shiferaw
(74) *Attorney, Agent, or Firm* — Fitzpatrick, Cella, Harper & Scinto

(57) ABSTRACT

A printer driver acquires capability from a print device to thereby acquire information (difference capability) regarding the difference between capability and a printer driver support function. The printer driver determines a print setting (a print setting to be transmitted) to be processed by the print device and a print setting (a print setting to be applied) to be processed by the printer driver based on the difference capability. When the selected print setting is the print setting to be transmitted, the printer driver transmits the print setting and original data to the print device. When the selected print setting is the print setting to be applied, the printer driver applies the print setting to original data to thereby generate print data.

9 Claims, 16 Drawing Sheets

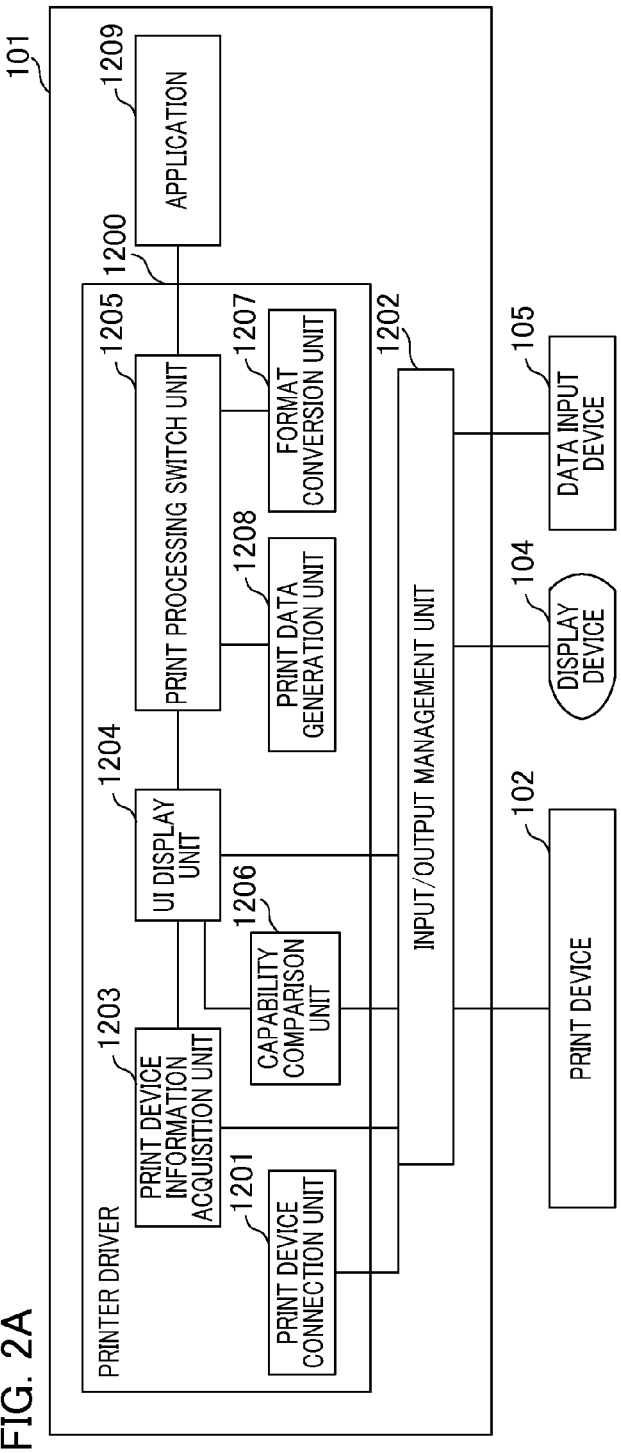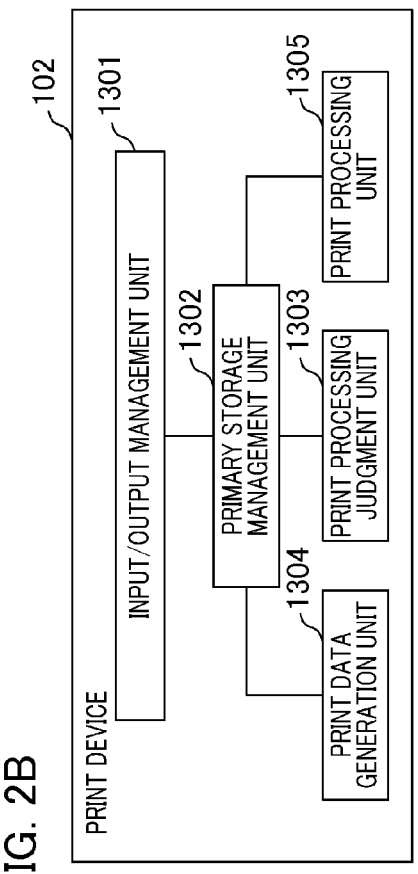

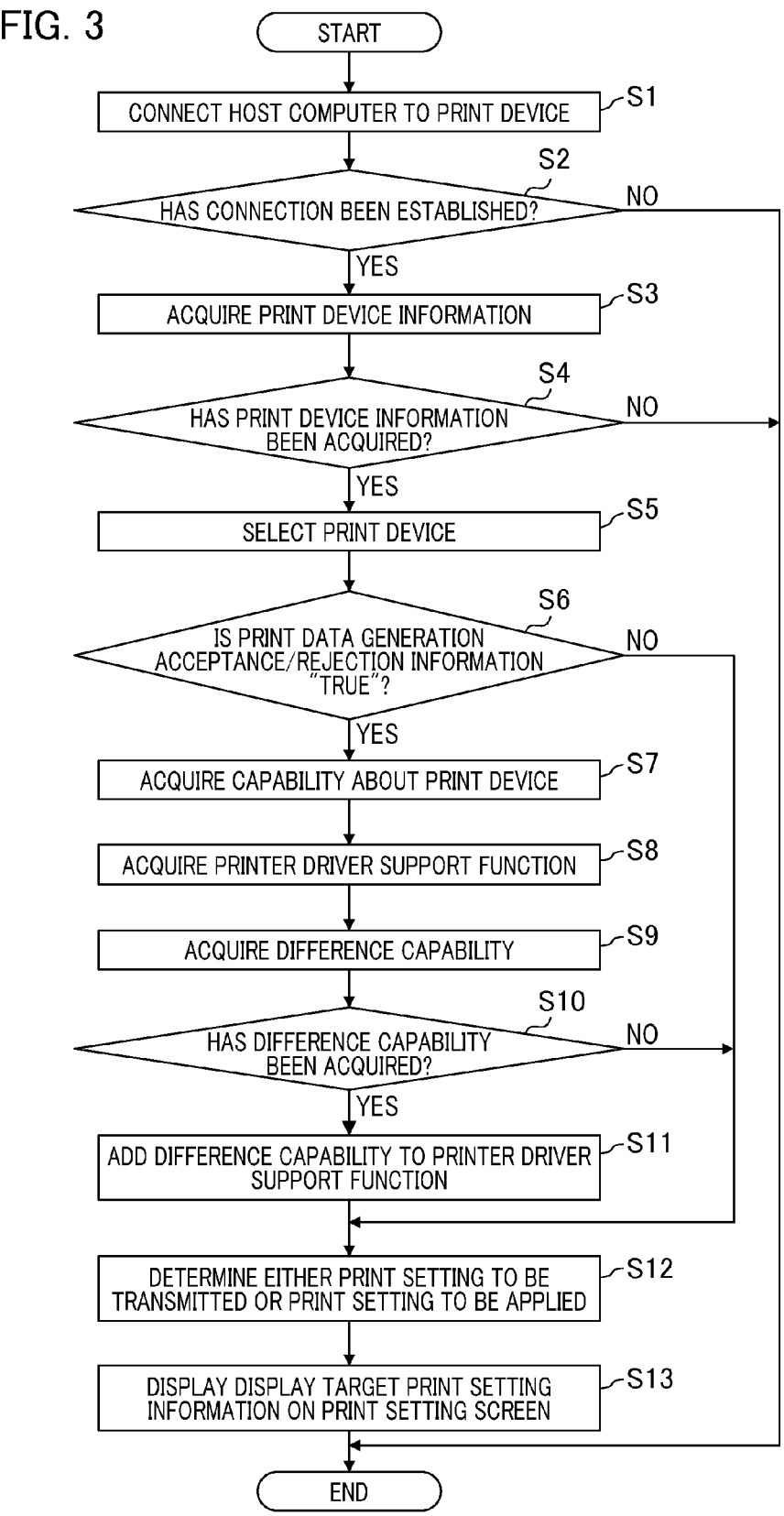

FIG. 6

```
<SETTING>
   MEDIA(JP=Media Type,US=Media Type),
   SIZE(JP=Printer Paper Size,US=Printer Paper Size),
   BORDER(JP=Borderless Printing,US=Borderless Printing),
   DUPLEX(JP=Duplex Printing,US=Duplex Printing),
   QUALITY(JP=Print Quality,US=Print Quality)
</SETTING>
<MEDIA>
   GLOSSY(JP=Glossy,US=Glossy)
</MEDIA>
<SIZE>
   L(JP=L,US=L 89x127mm)
</SIZE>
<BORDER>
   BORDER(JP=Border,US=Border),
   BORDERLESS(JP=Borderless,US=Borderless)
</BORDER>
<DUPLEX>
   MANUAL(JP=Manual,US=Manual)
</DUPLEX>
<QUALITY>
   HIGHT(JP=Hight,US=Hight)
</QUALITY>
<LIMIT>
   <MEDIA>
      GLOSSY
      <SIZE>
         L
         <BORDER>
            BORDER
            <DUPLEX>
               MANUAL
               <QUALITY>
                  HIGHT
               </QUALITY>
            </DUPLEX>
         </BORDER>
      </SIZE>
   </MEDIA>

...

</LIMIT>
<INK> C, M, Y </INK>
<CDR-R> FALSE </CDR-R>
```

```
<SETTING> MEDIA, SIZE, BORDER, DUPLEX, QUALITY </SETTING>
<MEDIA>
   PLAIN(JP=Plain,US=Plain)
</MEDIA>
<SIZE>
   A4(JP=A4,US=A4),
   B5(JP=B5,US=B5)
</SIZE>
<BORDER>
   BORDER(JP=Border,US=Border),
   BORDERLESS(JP=Borderless,US=Borderless)
</BORDER>
<DUPLEX>
   MANUAL(JP=Manual,US=Manual),
   AUTO(JP=Auto,US=Auto)
</DUPLEX>
<QUALITY>
   STANDARD(JP=Standard,US=Standard),
   FAST(JP=Fast,US=Fast)
</QUALITY>
<LIMIT>
   <MEDIA>
      PLAIN
      <SIZE>
         A4
         <BORDER>
            BORDER
            <DUPLEX>
               MANUAL
               <QUALITY>
                  STANDARD, FAST
               </QUALITY>
            </DUPLEX>
         </BORDER>
      </SIZE>
   </MEDIA>

...

</LIMIT>
```

```
                                               600
┌─────────────────────────────────────┐
│  <MEDIA>                            │
│     GLOSSY(JP=Glossy,US=Glossy)     │
│  </MEDIA>                           │
│  <SIZE>                             │
│     L(JP=L,US=L 89x127mm)           │
│  </SIZE>                            │
│  <QUALITY>                          │
│     HIGHT(JP=Hight,US=Hight)        │
│  </QUALITY>                         │
│  <LIMIT>                            │
│     <MEDIA>                         │
│        GLOSSY                       │
│        <SIZE>                       │
│           L                         │
│           <BORDER>                  │
│              BORDER                 │
│              <DUPLEX>               │
│                 MANUAL              │
│                 <QUALITY>           │
│                    HIGHT            │
│                 </QUALITY>          │
│              </DUPLEX>              │
│           </BORDER>                 │
│        </SIZE>                      │
│     </MEDIA>                        │
│                                     │
│     ...                             │
│                                     │
│  </LIMIT>                           │
│  <INK> C, M, Y </INK>               │
│  <CDR-R> FALSE </CDR-R>             │
└─────────────────────────────────────┘
```

| Media type | Paper size | Borderless printing | Duplex printing | Print quality |
|---|---|---|---|---|
| Plain paper | A4 | Bordered | Manual | Standard |
| | | | | Fast |
| | | | Auto | Fast |
| | | Borderless | Manual | Standard |
| | | | | Fast |
| | B5 | Bordered | Manual | Standard |
| | | | | Fast |
| | | | Auto | Fast |

FIG. 9B

| Media type | Paper size | Borderless printing | Duplex printing | Print quality |
|---|---|---|---|---|
| Plain paper | A4 | Bordered | Manual | Standard |
| | | | | Fast |
| | | | Auto | Fast |
| | | Borderless | Manual | Standard |
| | | | | Fast |
| | B5 | Bordered | Manual | Standard |
| | | | | Fast |
| | | | Auto | Fast |
| Glossy | L | Bordered | Manual | Hight |
| | | Borderless | | Hight |

FIG. 9C

| Print processing execution method | Media type | Paper size | Borderless printing | Duplex printing | Print quality |
|---|---|---|---|---|---|
| Printer driver | Plain paper | A4 | Bordered | Manual | Standard |
| | | | | | Fast |
| | | | | Auto | Fast |
| | | | Borderless | Manual | Standard |
| | | | | | Fast |
| | | B5 | Bordered | Manual | Standard |
| | | | | | Fast |
| | | | | Auto | Fast |
| Print device | Glossy | L | Bordered | Manual | Hight |
| | | | Borderless | | Hight |

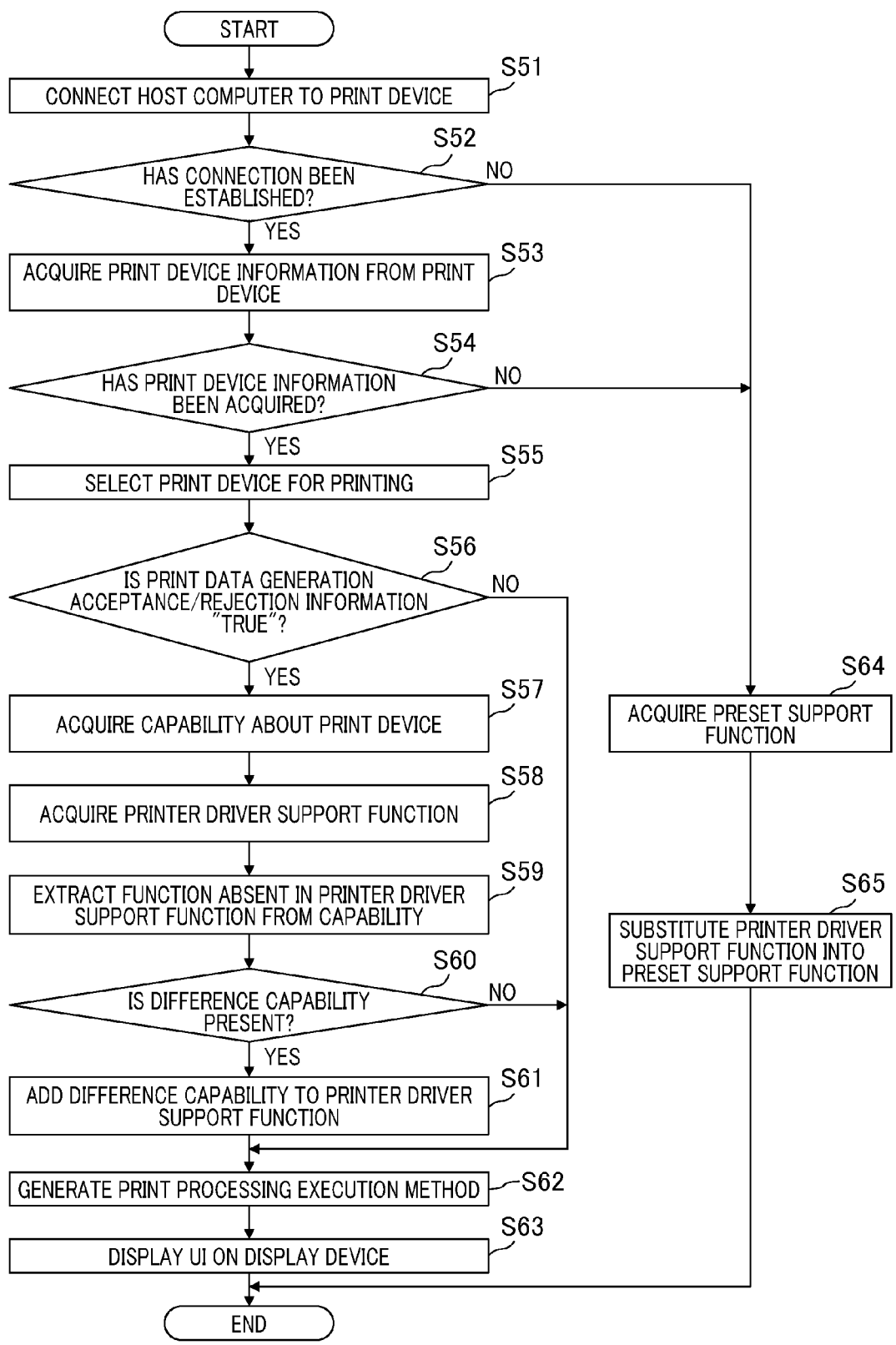

FIG. 14

| Print processing execution method | Media type | Paper size | Borderless printing | Duplex printing | Print quality |
|---|---|---|---|---|---|
| Printer driver | Plain paper | A4 | Bordered | Manual | Standard |
| | | | | | Fast |
| | | | | Auto | Fast |
| | | | Borderless | Manual | Standard |
| | | | | | Fast |
| | | B5 | Bordered | Manual | Standard |
| | | | | | Fast |
| | | | | Auto | Fast |
| Print device | Photo paper | L | Borderless | Manual | Hight |

```
<SETTING> ORIENTATION(JP=Orientation,US=Orientation) </SETTING>
<ORIENTATION>
  PORTRAIT(JP=Portrait,US=Portrait),
  LANDSCAPE(JP=Landscape,US=Landscape)
</ORIENTATION>
```

FIG. 15B

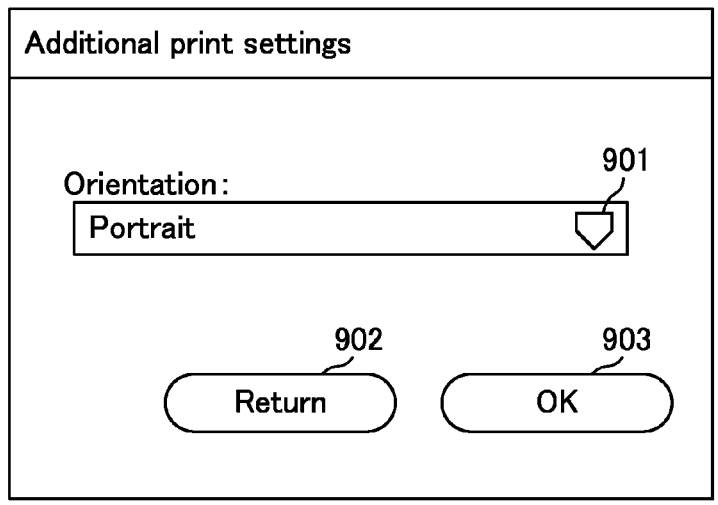

FIG. 17

```
<NO_SETTING> DUPLEX, QUALITY </NO_SETTING>
<MEDIA>
   GLOSSY(JP=Glossy,US=Glossy)
</MEDIA>
<SIZE>
   L(JP=L,US=L 89x127mm)
</SIZE>
<QUALITY>
   HIGHT(JP=Hight,US=Hight)
</QUALITY>
<LIMIT>
    <MEDIA>
        GLOSSY
        <SIZE>
            L
            <BORDER>
                BORDER
            </BORDER>
        </SIZE>
    </MEDIA>

...

</LIMIT>
<INK> C, M, Y </INK>
<CDR-R> FALSE </CDR-R>
```

STORAGE MEDIUM FOR PRINTER DRIVER PROGRAM, PRINT CONTROL APPARATUS, AND METHOD FOR CONTROLLING SAME

BACKGROUND OF THE INVENTION

1. Field of the Invention

The present invention relates to a storage medium for a printer driver program, a print control apparatus, and a method for controlling the same.

2. Description of the Related Art

A print control apparatus for causing a print device to execute a part of or all of print processing has been proposed. As an example of such print control apparatus, Japanese Patent Laid-Open No. 2004-171050 discloses a print control apparatus that causes a print device to execute print processing of a phase to be executed by the print device based on selection information indicating whether print processing is executed by either the print control apparatus or the print device for each phase of print processing. With this arrangement, the processing load on a program (hereinafter referred to as "printer driver" or "printer driver program") for performing print processing running on the print control apparatus is reduced.

Also, Japanese Patent Laid-Open No. 2001-071602 discloses an information processing apparatus that switches between a mode for converting print data into image data using a host computer and a PDL mode for converting print data into image data using a print device based on the result of the prediction of printing time.

In the conventional print control technique, a printer driver provided in a print control apparatus needs to include processing modules or parameters required for print processing such that print processing can be executed by both the print control apparatus and the print device. The ratio of these parameters to the total data volume in the printer driver is relatively high. Hence, in a device such as a thin client in which a reduction in storage capacity is required, storage capacity may not be reduced even if the conventional print control technique is applied thereto.

On the other hand, when there is a function not corresponding to the printer driver among the newly added functions (for example, new media type) in the print device, the printer driver cannot use the function. For example, a simple and general purpose printer driver (hereinafter referred to as "class driver") corresponding to a plurality of print devices in a similar system may not conform to the functions the newly added in the print device.

The class driver can execute print processing in the same way as the printer driver dedicated to a print device as long as the print device is a print device in a similar system, and its data volume has been reduced. However, the class driver cannot be used for those which can only be printed by a dedicated driver such as a new printing function or the like, provided in the print device.

SUMMARY OF THE INVENTION

A printer driver program stored in the storage medium of the present invention reduces data volume required for print processing and controls execution of print processing using a newly added function supported by the print device.

According to an aspect of the present invention, a computer-readable storage medium storing a printer driver program that generates print data based on original data and selected print setting is provided, wherein the printer driver program causes a computer to function as a print control apparatus which includes a connection unit configured to connect a print device to the computer on which the printer driver program is installed; a print data generation acceptance/rejection information acquisition unit configured to acquire print data generation acceptance/rejection information indicating whether or not the print device is capable of generating print data based on the original data and its print setting from the connected print device; a print setting information acquisition unit configured to acquire first print setting information corresponding to the printer driver program from a storage unit and to acquire second print setting information corresponding to the print device from the print device when the print data generation acceptance/rejection information indicates that the print device is capable of generating print data based on the original data and its print setting; a difference print setting information acquisition unit configured to acquire difference print setting information that is information regarding the difference between the first print setting information and the second print setting information; a print setting determination unit configured to determine a print setting, which is included in the second print setting information but is not included in the first print setting information, as the target to be processed by the print device and to determine a print setting, which is included in the first print setting information, as the target to be processed by the printer driver program based on the difference print setting information; a print setting judgment unit configured to judge whether selected print setting is a print setting determined as the target to be processed by the print device or a print setting determined as the target to be processed by the printer driver program; a print setting transmission unit configured to transmit the selected print setting and the original data to the print device when the print setting judgment unit has judged that the selected print setting is a print setting determined as the target to be processed by the print device; and a print data generation unit configured to generate print data based on the selected print setting and the original data when the print setting judgment unit has judged that the selected print setting is a print setting determined as the target to be processed by the printer driver program.

Further features of the present invention will become apparent from the following description of exemplary embodiments with reference to the attached drawings.

BRIEF DESCRIPTION OF THE DRAWINGS

FIG. 2 is a functional block diagram illustrating an example of a host computer and a print device.

FIG. 3 is a flowchart illustrating print setting screen display processing.

FIG. 6 is a diagram illustrating an example of capability about a print device.

FIG. 7 is a diagram illustrating an example of the printer driver support function.

FIG. 8 is a diagram illustrating an example of the difference capability.

FIGS. 9A, 9B and 9C are diagrams illustrating processing for determining a print setting to be transmitted and a print setting to be applied.

FIG. 13 is a flowchart illustrating print setting screen display processing.

FIG. 14 is a diagram illustrating an example of the preset support function.

FIG. 15A is a diagram illustrating an example of the difference capability.

FIG. 15B is a diagram illustrating an example of the additional print setting screen.

FIG. 17 is a diagram illustrating an example of the difference capability.

DESCRIPTION OF THE EMBODIMENTS

Figure 1:
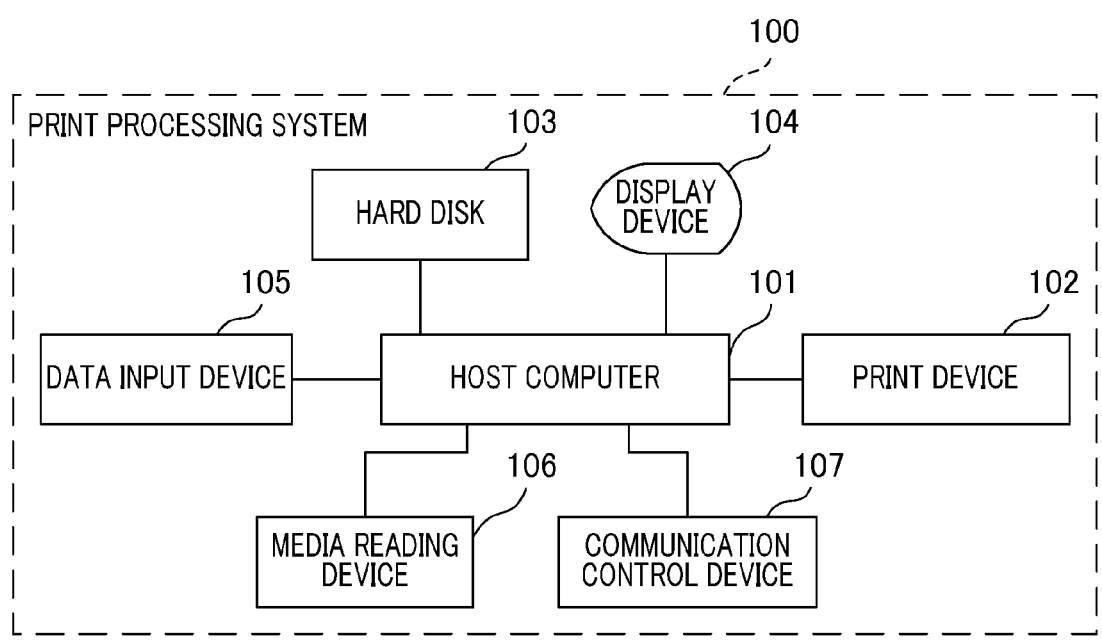
FIG. 1 is a diagram illustrating an example of the system configuration of the present embodiment.

FIG. 1 is a diagram illustrating an example of the system configuration of the present embodiment. A print processing system 100 shown in FIG. 1 prints out original data, which has been generated by an application run by a host computer 101, on a print medium using a print device 102. Original data is data to be printed. The format of original data is an image format such as JPEG or the like and a document format such as XML Format, PDF (Portable Document Format), or the like.

The print processing system 100 includes a host computer 101, a print device 102, a hard disk 103, a display device 104, a data input device 105, a media reading device 106, and a communication control device 107. The host computer 101 is the print control apparatus of the present embodiment. The host computer 101 executes a predetermined system program to thereby control and monitor the overall operation of the print processing system 100.

The host computer 101 functions as a computer including a CPU (Central Processing Unit), an internal memory, or the like arranged on a system board. The CPU reads out the required processing program from the internal memory, the external hard disk 103, or the like and executes the required processing program to thereby control the overall operation of the print processing system 100. In the present embodiment, the hard disk 103 stores various programs to be executed by the host computer 101 in advance. More specifically, the hard disk 103 stores the printer driver program of the present embodiment and various applications for generating original data in advance. In the following description, a printer driver program is also described as a "printer driver".

The print device 102 receives print data generated by a printer driver running on the host computer 101. Then, the print device 102 executes a predetermined print process to thereby print the received print data on a print medium. Also, the print device 102 receives original data and its print setting information from a printer driver, generates print data based on the received original data and its print setting information, and prints the generated print data on a print medium. Print setting information includes a group of set values (for example, plain paper for one example of media type) for specifying the operation of print processing among the selectable set values corresponding to the setting items such as media type, printer paper size, or the like.

The print device 102 is a various type of printer such as a serial printer, a page printer, other electronic copy printers, or the like. For the connection format between the print device 102 and the host computer 101, various connection forms such as stand-alone connection, network connection, or the like may be applied.

The display device 104 displays a predetermined UI (User Interface) in response to the instruction based on the execution of a system program, application, or the like by the host computer 101. The data input device 105 includes a keyboard, a mouse, other pointing devices, and the like. The data input device 105 receives various instructions from a print processing system user (hereinafter referred to as "user"), and conveys the received various instructions to the host computer 101. For example, the data input device 105 conveys print setting information, which has been input by a user via a UI displayed by the display device 104, to the host computer 101.

The media reading device 106 is a device including a CD-ROM drive, a flexible disk (registered trademark) drive, or the like. The media reading device 106 passes information, which has been read from a recording medium such as a CD-ROM, a flexible disk, or the like, to the host computer 101. The communication control device 107 functions as, for example, a connection interface that communicatively connects the print processing system 100 with an external network. Like a mobile communication device such as a mobile phone or the like, a part of the devices included in the print processing system 100 shown in FIG. 1 may also be incorporated in the host computer 101.

FIG. 2 is a functional block diagram illustrating an example of a host computer and a print device. FIG. 2A is a functional block diagram illustrating an example of the host computer 101. The host computer 101 shown in FIG. 2A includes an input/output management unit 1202, a printer driver 1200, and an application 1209.

The input/output management unit 1202 mediates communication between external devices (the print device 102 to the data input device 105) and the printer driver 1200. The printer driver 1200 is the printer driver of the present embodiment. The printer driver 1200 causes the host computer 101 to function as a unit for implementing the functions provided in the printer driver 1200. A method for controlling the print control apparatus of the present embodiment is realized by the printer driver 1200.

The printer driver 1200 has the function of generating print data based on original data generated by the application 1209 and the selected print setting. The printer driver 1200 also has the function of instructing the print device 102 to generate print data by transmitting the selected print setting and original data to the print device 102. The application 1209 generates original data and passes the generated original data to the printer driver 1200.

The printer driver 1200 includes a print device connection unit 1201, a print device information acquisition unit 1203, a UI display unit 1204, a print processing switch unit 1205, a capability comparison unit 1206, a format conversion unit 1207, and a print data generation unit 1208.

The print device connection unit 1201 functions as a connection unit that connects the print device 102 to the computer 101. The print device information acquisition unit 1203 acquires print device information from the print device 102 connected to the computer 101. Print device information includes at least print data generation acceptance/rejection information. Print data generation acceptance/rejection information is information indicating whether or not the print device 102 is capable of generating print data based on original data and its print setting. Thus, the print device information acquisition unit 1203 functions as a print data generation acceptance/rejection information acquisition unit that acquires print data generation acceptance/rejection information.

The UI display unit 1204 displays a print device selection screen. The print device selection screen is a UI screen for selecting the print device 102 which executes print processing. More specifically, the UI display unit 1204 displays information (for example, name) indicating the print device 102 connected to the computer 101 on the print device selection screen in a selective manner. Also, the UI display unit 1204 displays a print setting screen as a UI screen. More specifically, the UI display unit 1204 displays print settings, which are included in display target print setting information generated by the capability comparison unit 1206, on a print setting screen in a selective manner. The UI display unit 1204 functions as a print setting selection unit that selects print settings based on a user operation on a print setting screen.

The capability comparison unit 1206 executes the following processing when print data generation acceptance/rejection information corresponding to the print device 102 selected on the print device selection screen indicates that the print device 102 is capable of generating print data based on original data and its print setting.

In other words, the capability comparison unit 1206 functions as a print setting information acquisition unit. More specifically, the capability comparison unit 1206 acquires a printer driver support function from a predetermined storage unit provided in the computer 101. The printer driver support function includes print setting information (first print setting information) supported by (corresponding to) the printer driver 1200. Also, the capability comparison unit 1206 acquires capability corresponding to the print device 102 from the print device 102 selected on the print device selection screen via the input/output management unit 1202. Capability is information regarding the function and performance of the print device 102. Capability includes print setting information (second print setting information) supported by (corresponding to) the print device 102.

The capability comparison unit 1206 also functions as a difference print setting information acquisition unit. More specifically, the capability comparison unit 1206 compares the acquired printer driver support function with the capability to thereby acquire difference capability. Difference capability is information (difference print setting information) regarding the difference between the printer driver support function and capability. The capability comparison unit 1206 generates print setting information (display target print setting information) to be displayed on the UI screen based on difference capability and the printer driver support function. The capability comparison unit 1206 generates display target print setting information by adding, for example, difference capability to the printer driver support function.

Among the print settings included in display target print setting information, a print setting which is included in capability about the print device 102 but is not included in the printer driver support function is a print setting to be processed by the print device 102. The printer driver 1200 transmits a print setting to be processed by the print device 102 to the print device 102. Thus, in the following, the print setting is described as a "print setting to be transmitted". Among the print settings included in display target print setting information, a print setting included in the printer driver support function is a print setting to be processed by the printer driver 1200.

The printer driver 1200 applies the print setting to be processed to original data to thereby generate print data. Thus, in the following, the print setting to be processed is described as a "print setting to be applied". As described above, the capability comparison unit 1206 functions as a print setting determination unit that determines a print setting to be transmitted and a print setting to be applied based on difference capability.

The print processing switch unit 1205 functions as a print setting judgment unit that judges whether the print setting selected by a user on a print setting screen is either a print setting to be transmitted or a print setting to be applied. When the print processing switch unit 1205 has judged that the selected print setting is a print setting to be transmitted, the print processing switch unit 1205 passes original data and its print setting to the format conversion unit 1207, and instructs the format conversion unit 1207 to perform conversion of the data format of original data and its print setting.

The format conversion unit 1207 converts the data format of original data and its print setting into a format corresponding to the print device 102. When the data format of original data is a format (for example, XML format) not corresponding to the print device 102, the format conversion unit 1207 executes the following processing. The format conversion unit 1207 converts the data format of original data into a data format (for example, a general purpose image format such as a JPEG format or the like) corresponding to the print device 102.

Also, the format conversion unit 1207 converts the data format of the print setting into the same data format as the data format of original data. Then, the print processing switch unit 1205 transmits original data and its print setting, of which the data format has been converted, to the print device 102 via the input/output management unit 1202, and instructs the print device 102 to generate print data (functions as a print setting transmission unit).

Also, when the print processing switch unit 1205 has judged that the selected print setting is a print setting to be applied, the print processing switch unit 1205 passes original data and its print setting to the print data generation unit 1208, and instructs the print data generation unit 1208 to generate print data. The print data generation unit 1208 functions as a print data generation unit that generates a print setting based on original data and its print setting passed from the print processing switch unit 1205. The print processing switch unit 1205 transmits the generated print data to the print device 102 via the input/output management unit 1202, and instructs the print device 102 to perform print processing.

FIG. 2B is a functional block diagram illustrating an example of the print device. The print device 102 includes an input/output management unit 1301, a primary storage management unit 1302, a print processing judgment unit 1303, a print data generation unit 1304, and a print processing unit 1305.

The input/output management unit 1301 performs communication to/from the host computer 101. For example, the input/output management unit 1301 receives print data from the host computer 101, and passes print data to the primary storage management unit 1302. The primary storage management unit 1302 stores print data received from the input/output management unit 1301 in a predetermined primary storage region. Also, for example, the input/output management unit 1301 receives original data and its print setting from the host computer 101, and passes them to the primary storage management unit 1302. The primary storage management unit 1302 stores original data and its print setting received from the input/output management unit 1301 in the primary storage region.

The print processing judgment unit 1303 refers to data stored in the primary storage region and judges whether or not the print device 102 executes print data generation processing. When original data and its print setting are stored in the primary storage region, the print processing judgment unit 1303 judges that the print device 102 executes print data generation processing. When print data is stored in the primary storage region, the print processing judgment unit 1303 judges that the print device 102 does not execute print data generation processing.

When the print processing judgment unit 1303 has judged that the print device 102 executes print data generation processing, the print data generation unit 1304 acquires original data and its print setting from the primary storage region. The print data generation unit 1304 generates print data based on the acquired original data and its print setting. The print data generation unit 1304 stores the generated print data in the primary storage region via the primary storage management unit 1302.

When the print processing judgment unit 1303 has judged that the print device 102 does not execute print data generation processing, the print processing unit 1305 acquires print data from the primary storage region, and performs print processing on a print medium. Also, the print processing unit 1305 acquires print data generated by the print data generation unit 1304 from the primary storage region, and performs print processing on a print medium.

FIG. 3 is a flowchart illustrating print setting screen display processing according to a first embodiment of the present invention. Print setting screen display processing described with reference to FIG. 3 is executed each time the host computer 101 activates the printer driver 1200.

First, when the printer driver 1200 is activated, the print device connection unit 1201 executes connection processing for connecting the host computer 101 to one or a plurality of the print devices 102 (step S1). Next, the print device connection unit 1201 judges whether or not the connection between the host computer 101 and the print device 102 has been established (step S2). When the connection between the host computer 101 and the print device 102 has not been established, the process is ended.

When the connection between the host computer 101 and the print device 102 has been established, the print device information acquisition unit 1203 acquires print device information from the print device 102 connected to the computer 101 (step S3). Print device information includes at least print data generation acceptance/rejection information.

Figure 4:
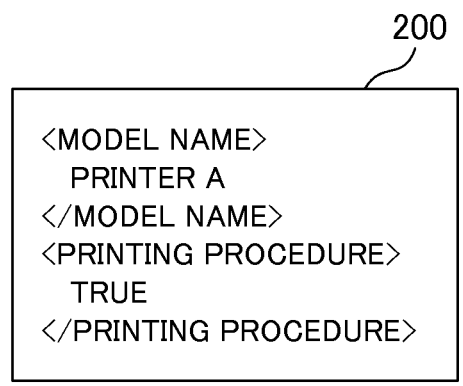
FIG. 4 is a diagram illustrating an example of print device information.

FIG. 4 is a diagram illustrating an example of print device information. In a print device information 200 shown in FIG. 4, parentheses (<~> and </~> in FIG. 4) indicate the attribute names of information. An attribute value corresponding to the attribute name is set in advance immediately after the attribute name. For example, the attribute name <MODEL NAME> indicates the name of the print device 102. The name corresponding to the attribute name is "PRINTER A".

Also, the attribute name <PRINTING PROCEDURE> indicates the attribute name of print data generation acceptance/rejection information. The attribute value "TRUE" or "FALSE" corresponding to the attribute name <PRINTING PROCEDURE> indicates the attribute value of print acceptance/rejection information. The attribute value "TRUE" indicates that the print device 102 is capable of generating print data based on original data and its print setting. The attribute value "FALSE" indicates that the print device 102 is incapable of generating print data based on original data and its print setting.

In the example shown in FIG. 4, the print device information 200 has two attribute names, but the present invention is not limited thereto. The attribute name of the print device information 200 may include presence/absence of a liquid crystal display of a print device.

Referring back to FIG. 3, the print device information acquisition unit 1203 judges whether or not print device information has been acquired (step S4). When print device information has not been acquired, the process is ended. When print device information has been acquired, the UI display unit 1204 displays the print device 102 (the name thereof) corresponding to print device information on a print device selection screen in a selective manner.

Figure 5:
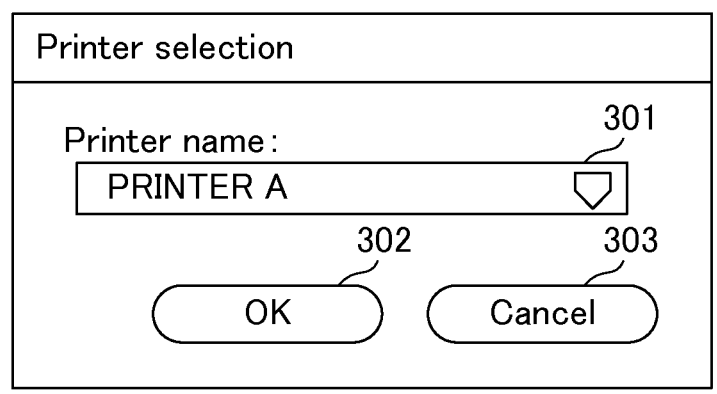
FIG. 5 is a diagram illustrating an example of the print device selection screen.

FIG. 5 is a diagram illustrating an example of the print device selection screen. The UI display unit 1204 displays the name of the print device 102 corresponding to the print device information 200 on a selection unit 301 in the print device selection screen. When a plurality of print devices 102 is connected to the host computer 101 and the print device information 200 has been acquired from the plurality of print devices 102, the UI display unit 1204 displays a list of names of the print devices 102 corresponding to the print device information 200 on the selection unit 301.

When a user specifies the print device 102 of which the name is displayed on the selection unit 301, the UI display unit 1204 selects the print device 102 specified by the user as the print device 102 for executing print processing. An OK button 302 is a button that is depressed to determine the selection by the UI display unit 1204. A cancel button 303 is a button that is depressed to end print processing.

Referring back to FIG. 3, the UI display unit 1204 selects the print device 102 for executing print processing in accordance with a user's specified operation on the print device selection screen, and determines the selection (step S5). Next, the capability comparison unit 1206 judges whether or not the attribute value of print data generation acceptance/rejection information included in print device information corresponding to the print device 102 selected in step S5 is "TRUE" (step S6). When the attribute value of print data generation acceptance/rejection information is not "TRUE" but "FALSE", the process advances to step S12. When the attribute value of print data generation acceptance/rejection information is "TRUE", the process advances to step S7. In step S7, the capability comparison unit 1206 acquires capability corresponding to the print device 102 from the print device 102 (step S7).

FIG. 6 is a diagram illustrating an example of capability about a print device. The parentheses (<~> and </~>) described in capability 350 shown in FIG. 6 indicate the attribute names of information. An attribute value corresponding to the attribute name is set in advance immediately after the attribute name.

For example, the attribute name <SETTING> indicates the setting items of print setting values that are specifiable to the print device 102. As the attribute name <SETTING>, MEDIA representing media type, SIZE representing printer paper size, BORDER representing borderless full printing, DUPLEX representing duplex printing, and QUALITY representing print quality are set. When print processing is performed by the print device 102, capability shown in FIG. 6 indicates that the aforementioned five items are specifiable as print setting values.

Also, the attribute name <MEDIA> stores the settable value of the setting item "media type" and its localized character string as attribute values. The attribute name <SIZE> stores the settable value of the setting item "printer paper size" and its localized character string as attribute values. The attribute name <BORDER> stores the settable value of the setting item "borderless full printing" and its localized character string as attribute values. The attribute name <DUPLEX> stores the settable value of the setting item "duplex printing" and its localized character string as attribute values. The attribute name <QUALITY> stores the settable value of the setting item "print quality" and its localized character string as attribute values.

The attribute name <LIMIT> stores the relationship between the aforementioned setting items. In the example shown in FIG. 6, when the setting item "printer paper size" has been selected as "L", it means that "border (BORDER in FIG. 6)" and "borderless (BORDERLESS in FIG. 6)" are specifiable for the setting item "borderless full printing".

Referring back to FIG. 3, the capability comparison unit 1206 acquires a printer driver support function from a predetermined storage unit provided in the computer 101 (step S8).

FIG. 7 is a diagram illustrating an example of the printer driver support function. The parentheses (<~> and </~>) described in a printer driver support function 400 shown in FIG. 7 indicate the attribute names of information. The attribute names are setting items required for print processing. An attribute value corresponding to the attribute name is set in advance immediately after the attribute name. The attribute value is a set value corresponding to the setting item.

Referring back to FIG. 3, the capability comparison unit 1206 acquires difference capability by taking the difference between the printer driver support function and capability (step S9). In this example, the capability comparison unit 1206 acquires a print setting, which is not included in the printer driver support function 400 shown in FIG. 7 among the print settings included in the capability 350 shown in FIG. 6, as difference capability.

FIG. 8 is a diagram illustrating an example of difference capability acquired by the capability comparison unit 1206. The difference capability 600 shown in FIG. 8 includes a print setting that is not included in the printer driver support function 400 among the print settings included in the capability 350. In the present embodiment, when the capability 350 is the same as the printer driver support function 400 or the printer driver support function 400 incorporates the capability 350, difference capability is intended not to be acquired.

Referring back to FIG. 3, the capability comparison unit 1206 judges whether or not difference capability has been acquired (step S10). When difference capability has not been acquired, the process advances to step S12. When difference capability has been acquired, the process advances to step S11.

In step S11, the capability comparison unit 1206 adds the difference capability 600 to the printer driver support function 400, and generates print setting information (display target print setting information) to be displayed on the print setting screen (step S11). Next, the capability comparison unit 1206 determines whether or not each of the print settings included in display target print setting information is either a print setting to be transmitted or a print setting to be applied (step S12).

In step S12, the capability comparison unit 1206 determines a print setting, which is included in print setting information (second print setting information) included in capability but is not included in print setting information (first print setting information) included in the printer driver support function, as a print setting to be transmitted. Also, the capability comparison unit 1206 determines print setting information included in the printer driver support function as a print setting to be applied.

FIG. 9 is a diagram illustrating processing for determining a print setting to be transmitted and a print setting to be applied by means of a capability comparison unit. FIG. 9A shows the printer driver support function 400 expressed in a table format. In the example shown in FIG. 9A, the printer driver support function 400 supports a plain paper as the media type. The paper size "A4" or "B5" is selectable. Also, the paper size "A4" supports both "borderless" and "bordered" for borderless printing, but the paper size "B5" only supports "bordered".

FIG. 9B is a diagram illustrating results of addition of difference capability 600 to the printer driver support function 400. Information regarding print settings corresponding to the setting items and set values shown in FIG. 9B is display target print setting information. In this example, the capability comparison unit 1206 adds glossy (the attribute value "GLOSSY" of the attribute name <MEDIA> shown in FIG. 8) in the difference capability 600 to the printer driver support function 400 shown in FIG. 9A.

In the difference capability 600 shown in FIG. 8, the attribute values for the attribute name <INK> and the attribute name <CDR-R> do not have a localized character string. Thus, the capability comparison unit 1206 judges that a print setting corresponding to these attribute names is an unselectable print setting.

FIG. 9C is a diagram illustrating an example of processing for determining a print setting to be transmitted and a print setting to be applied. Among the print settings included in display target print setting information shown in FIG. 9B, a print setting corresponding to the media type "plain paper" is a print setting included in the printer driver support function 400. Thus, the capability comparison unit 1206 determines a print setting corresponding to the media type "plain paper" as a print setting to be applied. As shown in FIG. 9C, the capability comparison unit 1206 adds the item "print processing execution method", and sets "printer driver" as the print processing execution method corresponding to the print setting to be applied. A print setting in which "printer driver" is set for the print processing execution method indicates that the print setting is a print setting to be applied.

Among the print settings corresponding to the setting items and set values shown in FIG. 9B, a print setting corresponding to the media type "glossy" is a print setting which is included in print setting information included in capability but is not included in print setting information included in the printer driver support function. Thus, the capability comparison unit 1206 determines a print setting corresponding to the media type "glossy" as a print setting to be transmitted.

As shown in FIG. 9C, the capability comparison unit 1206 sets the print processing execution method "print device" to a print setting corresponding to the media type "glossy". A print setting in which "print device" is set as the print processing execution method indicates that the print setting is a print setting to be transmitted. In other words, the print processing execution method indicates whether the corresponding print setting is either a print setting to be transmitted or a print setting to be applied. The capability comparison unit 1206 stores the determination processing results of the print setting to be transmitted and the print setting to be applied in a predetermined storage unit.

Referring back to FIG. 3, the UI display unit 1204 displays display target print setting information on a print setting screen (step S13), and the process is ended.

Figure 10:
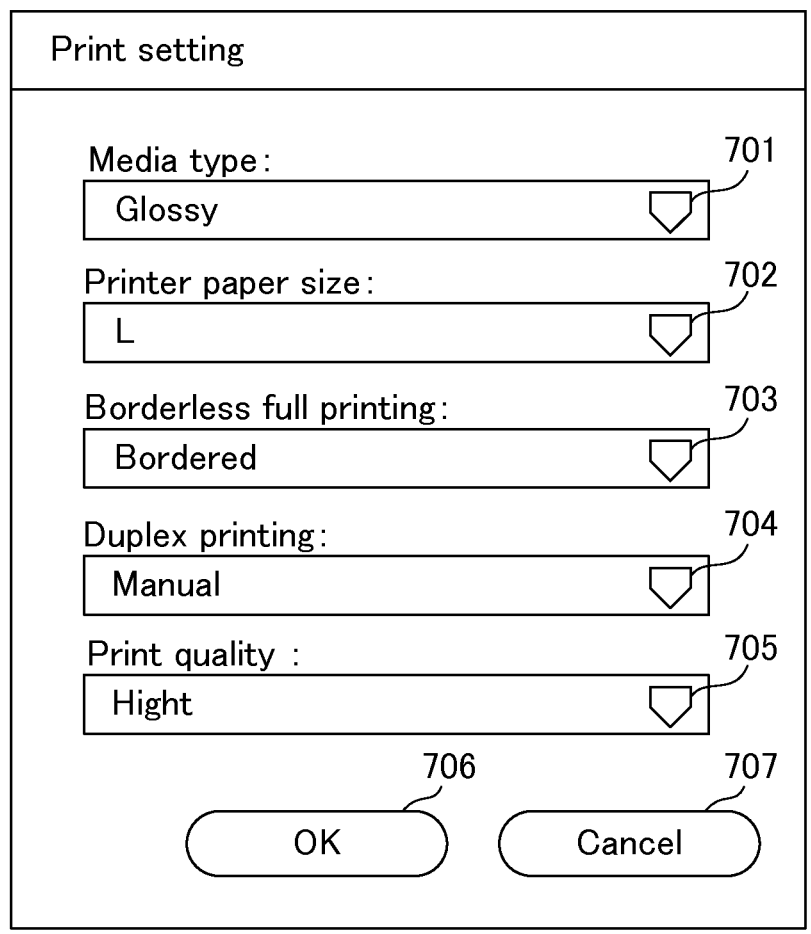
FIG. 10 is a diagram illustrating an example of the print setting screen.

FIG. 10 is a diagram illustrating an example of the print setting screen. The UI display unit 1204 displays the print setting (setting items and set values) included in display target print setting information on the print setting screen in a selective manner. More specifically, the UI display unit 1204 displays the set values, which correspond to the setting items displayed on the print setting screen, in the pull-down format on the selection units 701 to 705. When a user selects setting items and set values displayed on the selection units and depresses an OK button 706, the print setting corresponding to the selected setting items and set values are selected. A cancel button 707 is a button that is depressed to end print processing.

Figure 11:
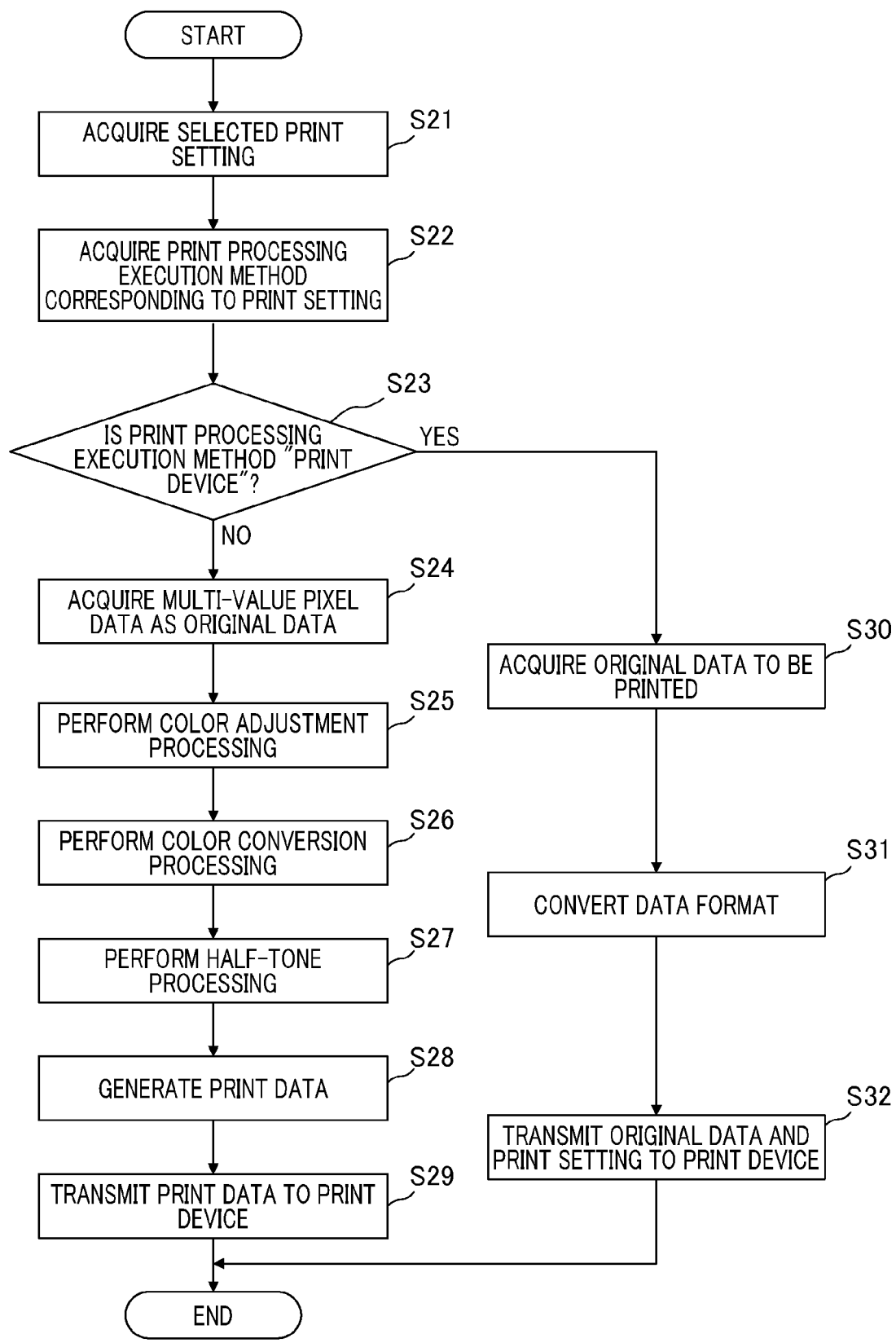
FIG. 11 is a flowchart illustrating print processing performed by a host computer.

FIG. 11 is a flowchart illustrating print processing performed by a host computer. First, the UI display unit 1204 acquires the selected print setting based on a user operation on the print setting screen (step S21).

Next, the print processing switch unit 1205 refers to the determination processing result of the print setting to be transmitted and the print setting to be applied, which are stored in a predetermined storage unit, and acquires a print processing execution method corresponding to the print setting acquired in step S21 (step S22).

Next, the print processing switch unit 1205 judges whether either "print device" or "printer driver" has been set to the acquired print processing execution method (step S23). When "print device" has been set to the print processing execution method, the print processing switch unit 1205 judges that the print setting is a print setting to be transmitted, and the process advances to step S30.

In step S30, the print processing switch unit 1205 acquires original data to be printed from the application 1209, and passes the acquired original data and its print setting to the format conversion unit 1207 (step S30).

Next, the format conversion unit 1207 converts the data format of original data and its print setting, which have been passed from the print processing switch unit 1205, into the data format corresponding to the print device 102 (step S31). For example, when the format conversion unit 1207 has received an XML format not corresponding to the print device 102, the format conversion unit 1207 converts the data format of original data and its print setting into a general purpose image format (for example, JPEG format) corresponding to the print device 102. When the data format of original data is a general purpose image format, the process in step S31 is omitted. Next, the input/output management unit 1202 transmits original data and its print setting, of which the data format has been converted, to the print device 102 (step S32).

When "print device" is set to the print processing execution method during judgment processing in step S23, the print processing switch unit 1205 judges that the print setting is a print setting to be applied, and the process advances to step S24.

In step S24, the print processing switch unit 1205 acquires original data to be printed from the application 1209 in a data format processable by the printer driver 1200 (step S24). For example, the print processing switch unit 1205 acquires multi-value pixel data having luminance information about RGB (Red, Green, and Blue) as original data, and passes the acquired pixel data to the print data generation unit 1208. Also, the print processing switch unit 1205 passes the print setting to the print data generation unit 1208.

Next, the print data generation unit 1208 executes color adjustment processing based on the received print data and its print setting (step S25). For example, the print data generation unit 1208 performs color adjustment processing by converting RGB data for each pixel of multi-value pixel data into R'G'B' data suitable for the print device 102. The print data generation unit 1208 refers to a look-up table, which is stored in a storage unit in advance and corresponds to the print setting, and executes color adjustment processing.

Next, the print data generation unit 1208 executes color conversion processing (step S26). For example, the print data generation unit 1208 converts R'G'B' data obtained by color adjustment processing into density data of CMYK (cyan, magenta, yellow, and black) corresponding to ink colors for use in the print device 102 for each multi-value pixel (for each unit pixel). The print data generation unit 1208 also refers to a look-up table, which is stored in a storage unit in advance and corresponds to the print setting, and executes color conversion processing. As specific conversion method the print data generation unit 1208 substitutes a part of achromatic color components with K (black) while substituting RGB values with respective complimentary colors, CMY.

Next, the print data generation unit 1208 executes half-tone processing for the color conversion processing result obtained in step S26 (step S27). For example, the print data generation unit 1208 generates half-tone data based on CMYK density data. Half-tone data is data that expresses an image depending on the presence/absence of ink drip formed by the print device 102.

Next, the print data generation unit 1208 generates print data decryptable by the print device 102 based on half-tone data generated in step S27 and the operation control command of the print device 102 (step S28). Then, the input/output management unit 1202 transmits the generated print data to the print device 102 (step S29). When the print device 102 receives print data transmitted from the input/output management unit 1202, the print device 102 operates in accordance with the content of print data to thereby execute print processing on a print medium.

Figure 12:
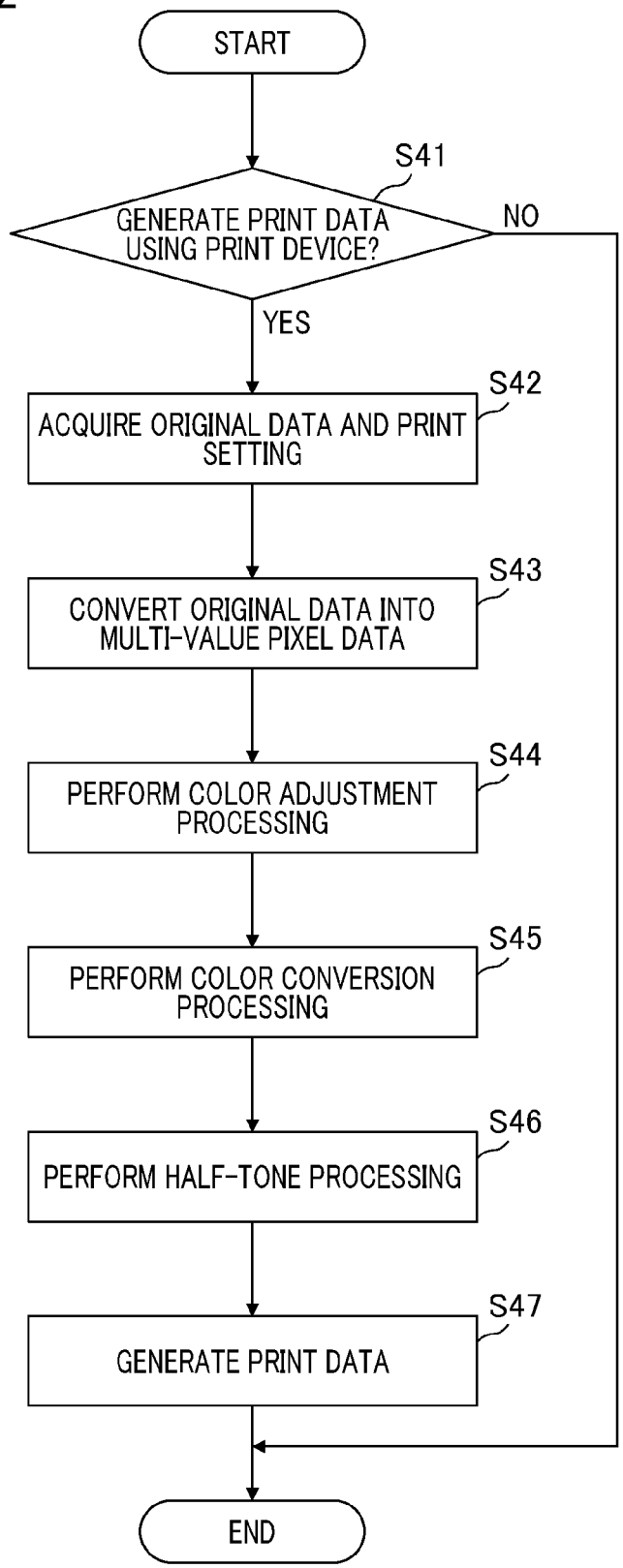
FIG. 12 is a flowchart illustrating print processing performed by a print device.

FIG. 12 is a flowchart illustrating print processing performed by a print device. A print processing judgment unit 1303 judges whether or not the print device 102 performs print data generation processing based on the data content stored in the primary storage region (step S41). When print data is stored in the primary storage region, the print processing judgment unit 1303 judges that the print device 102 does not execute print data generation processing, and the process is ended. When original data and its print setting are stored in the primary storage region, the print processing judgment unit 1303 judges that the print device 102 executes print data generation processing, and the process advances to step S42.

In step S42, the print data generation unit 1304 acquires original data and its print setting from the primary storage region (step S42). Then, the print data generation unit 1304 converts the acquired original data into multi-value pixel data (step S43). Steps S44 to S47 are the same as steps S25 to S28 shown in FIG. 11.

While, in the present embodiment, processing is switched by the content of data stored in the primary storage region, the present invention is not limited thereto. For example, the print processing switch unit 1205 of the printer driver 1200 may transmit information indicating whether or not the print device 102 executes print data generation processing to the print device 102 in advance and the print device 102 may switch processing based on information.

The print data generation unit 1304 stores print data generated in step S47 in the primary storage region. The print processing unit 1305 acquires print data stored in the primary storage region, and prints the acquired print data on a print medium in accordance with the instruction given by the acquired print data. The print processing unit 1305 deletes data content stored in the primary storage region when print processing is ended.

According to the printer driver of the present embodiment, a certain print quality may be ensured while reducing data volume required for print processing. The reason for this will be described below.

When print processing is performed by a print device, the print device converts original data to be printed into a general purpose image format. It is disadvantageous for the print device to convert the data format of original data into, for example, JPEG format in terms of image quality for original data including characters. The JPEG format applies a compression method that is irreversible to original data. The compression method cuts out a large amount of the high-frequency components of data when the compression rate increases. Consequently, the outline of dots and lines configuring characters is blurred. In contrast, when the compression rate decreases, the mosquito noise occurs in the outline of dots and lines or data volume to be processed by the print device increases, whereby the load of the transmission path or the print device undesirably increases. Thus, it is inappropriate for the print device to perform all of the print processes.

On the other hand, the printer driver of the present embodiment generates print data by the printer driver itself or transmits original data and its print setting to the print device depending on the print setting. For example, the printer driver sets a print setting corresponding to the setting item of the media type "plain paper", which is often used as a medium on which characters are printed, as the target to be processed by itself. With this arrangement, the printer driver eliminates any need for converting the format of original data into a general purpose format, and thus, the foregoing problems associated with the compression method may be avoided.

On the other hand, since a photographic image has a small high-frequency component of the outline thereof, image blur does not readily occur. Assume the case where a print setting corresponding to the setting item of the media type "photographic paper" which is used for printing the photographic image, corresponds to the print device but is not supported by the printer driver. In this case, the printer driver of the present embodiment sets a print setting corresponding to the setting item "photographic paper" as the target to be processed by the print device. Consequently, the parameter indicating the media type "photographic paper" does not need to be held by the printer driver, and thus, the volume of the parameters for the media type "photographic paper" can be reduced.

In the present embodiment, in the drawings, print device information, capability, printer driver support function, difference capability, and print setting are described in text format. However, the description method is not limited to text format but may be other formats such as binary format or the like.

Next, a description will be given of a second embodiment of the present invention. The printer driver of the second embodiment has the same configuration as that of the printer driver of the first embodiment. The printer driver of the second embodiment can execute print processing even when the connection between the host computer 101 and the print device 102 cannot be established.

FIG. 13 is a flowchart illustrating print setting screen display processing according to the second embodiment of the present invention. Steps S51 to S63 shown in FIG. 13 are the same as steps S1 to S13 shown in FIG. 3.

In the second embodiment, when it has been judged in step S52 that the connection between the host computer 101 and the print device 102 cannot be established, the process advances to step S64. Also, when it has been judged in step S54 that print device information cannot be acquired, the process advances to step S64.

In step S64, the UI display unit 1204 acquires a preset support function (step S64). The preset support function includes print settings stored in a predetermined storage unit in advance. Each of the print settings included in the preset support function is predetermined to be either a print setting to be transmitted or a print setting to be applied.

FIG. 14 is a diagram illustrating an example of the preset support function. The preset support function shown in FIG. 14 has the same configuration as that of the table shown in FIG. 9C. In other words, a print setting in which "printer driver" is set as the print processing execution method indicates that the print setting is a print setting to be applied. Also, a print setting in which "print device" is set as the print processing execution method indicates that the print setting is a print setting to be transmitted.

Referring back to FIG. 13, the UI display unit 1204 acquires the printer driver support function and substitutes the printer driver support function into the preset support function (step S65), and the process advances to step S63. Print processing performed by the host computer of the second embodiment is the same as that performed by the host computer of the first embodiment described with reference to FIG. 11.

According to the printer driver of the second embodiment, a print setting may be selected using the preset support function without finishing print processing even when the connection between the print device and the computer 101 has not been established.

Next, a description will be given of a third embodiment. Among the processes to be executed by the third embodiment, the description about the same processes as those to be executed by the first embodiment will be omitted.

FIG. 15 is a diagram illustrating an example of the difference capability to be acquired in the third embodiment and an example of the additional print setting screen. FIG. 15A is a diagram illustrating an example of the difference capability. In this example, capability about the print device 102 includes a setting item(s) not included in the printer driver support function. The setting item "orientation" corresponding to the attribute name <ORIENTATION>, which is included in a difference capability 900 shown in FIG. 15A, is the setting item not included in the printer driver support function.

FIG. 15B is a diagram illustrating an example of the additional print setting screen. The additional print setting screen is a screen for adding a print setting. For example, it is assumed that the case where the UI display unit 1204 displays the print setting screen shown in FIG. 10.

When a user selects the set values of the setting items on the print setting screen and depresses the OK button 706, the UI display unit 1204 displays the additional print setting screen shown in FIG. 15B. The UI display unit 1204 displays the setting item "orientation" included in the difference capability shown in FIG. 15A on the additional print setting screen. Also, the UI display unit 1204 displays a set value (for example, "portrait" and "landscape") corresponding to the setting item "orientation" in the pull-down format on a selection unit 901. When a user selects the setting items and the set values displayed on the selection units and depresses an OK button 902, a print setting corresponding to the selected setting items and set values is selected.

When there is a plurality of setting items included in capability about the print device 102 but not included in the printer driver support function, the UI display unit 1204 may display all groups of all setting items and their set values on the additional print setting screen or may display a group of a setting item and its set value one by one. Note that, when a user depresses a return button 903, the UI display unit 1204 displays a screen that has been displayed immediately prior to displaying the additional print setting screen.

According to the printer driver of the third embodiment, a print setting may be selected by displaying the setting items included in capability about the print device but not included in the printer driver support function are displayed without missing any items.

Next, a description will be given of a fourth embodiment of the present invention. In the fourth embodiment, the difference capability includes a print setting which is included in capability but is not included in the printer driver support function and a print setting which is included in the printer driver support function but is not included in capability. Then, the capability comparison unit 1206 determines a print setting which is included in the printer driver support function but is not included in capability as an unselectable print setting.

Figure 16:
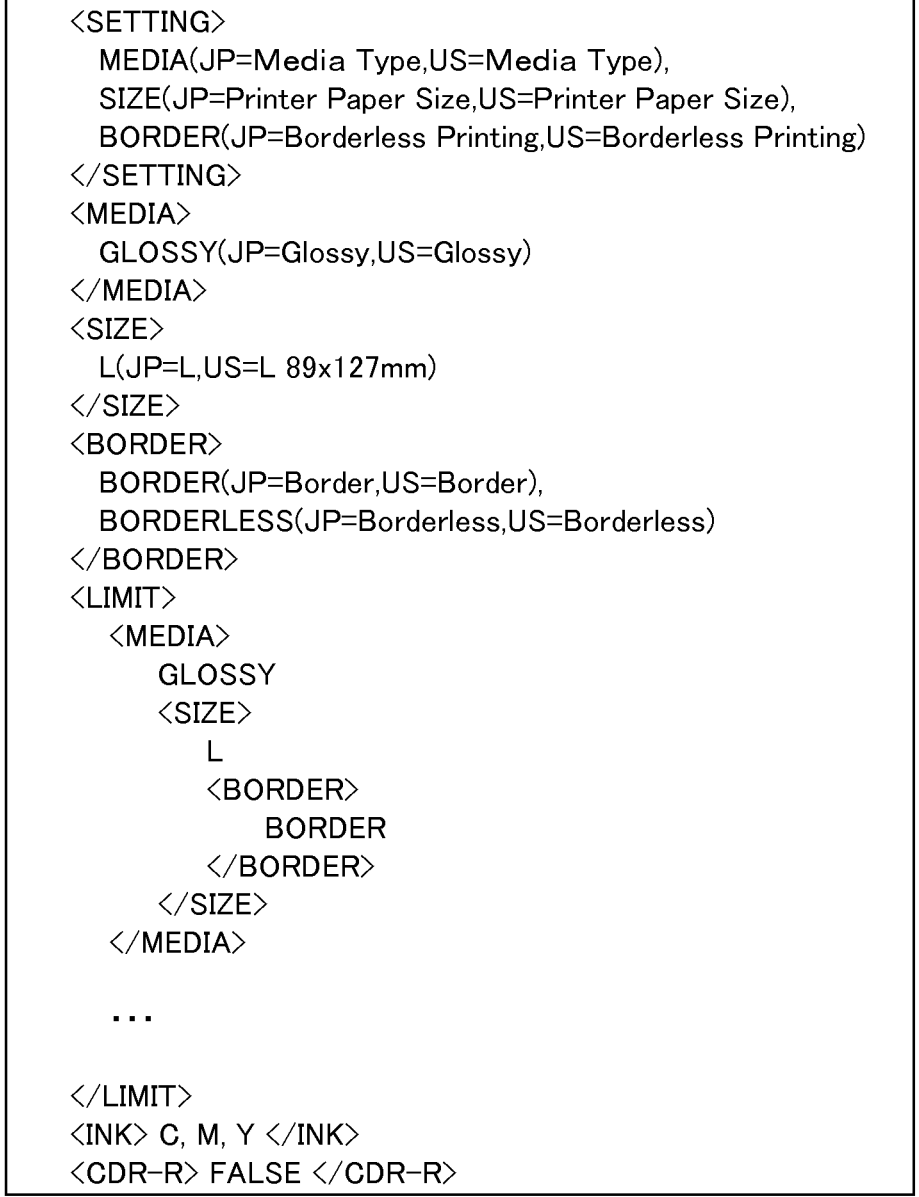
FIG. 16 is a diagram illustrating an example of the capability.

FIG. 16 is a diagram illustrating an example of the capability acquired according to the fourth embodiment. Also, FIG. 17 is a diagram illustrating an example of the difference capability acquired according to the fourth embodiment. The attribute name <NO_SETTING> included in difference capability 1100 shown in FIG. 17 is an attribute name (setting item) which is absent in the capability 1000 among the printer driver support function 1000 shown in FIG. 16. In this example, the attribute names "DUPLEX (duplex printing)" and "QUALITY (print quality)" are set to the attribute name <NO_SETTING>.

In this example, the attribute name <NO_SETTING> is associated with the media type "glossy". Thus, for the media type "glossy", the capability comparison unit 1206 determines a print setting corresponding to the attribute names "DUPLEX (duplex printing)" and "QUALITY (print quality)" as an unselectable print setting.

Figure 18:
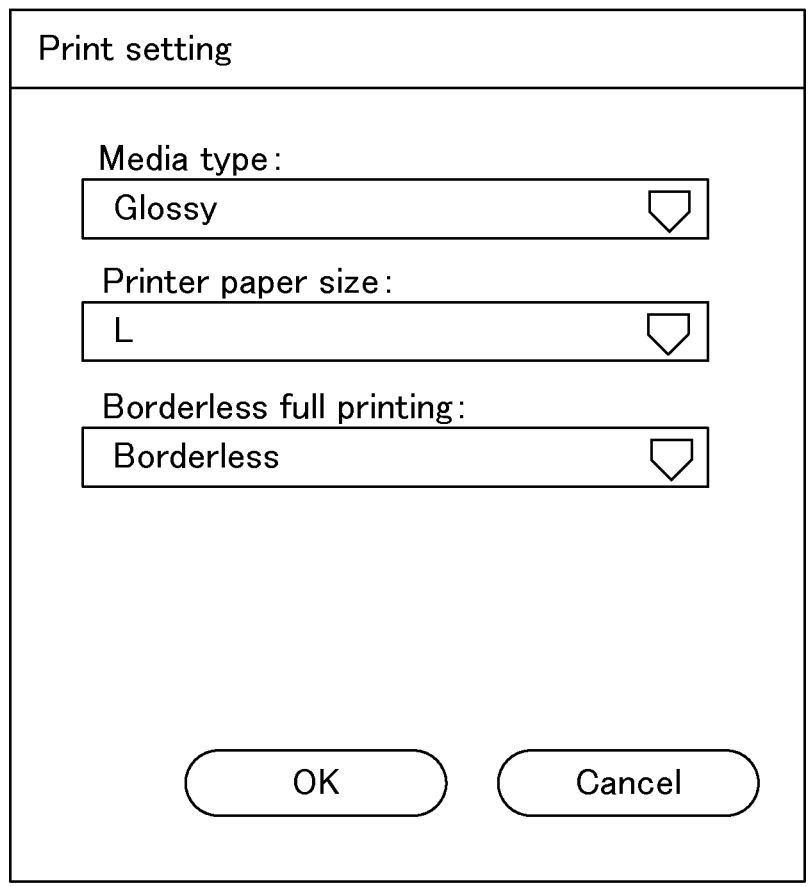
FIG. 18 is a diagram illustrating an example of the print setting screen.

FIG. 18 is a diagram illustrating an example of the print setting screen according to the fourth embodiment. In this example, the UI display unit 1204 displays print settings corresponding to setting items such as media type, printer paper size, borderless full printing, and the like on the print setting screen in a selective manner. However, the UI display unit 1204 does not display the print settings corresponding to setting items such as duplex printing and print quality, which have been determined as the unselectable print settings by the capability comparison unit 1206, on the print setting screen. With this arrangement, the UI display unit 1204 prevents a user from selecting the print settings corresponding to setting items such as duplex printing and print quality. According to the fourth embodiment, a print setting not corresponding to print processing performed by the print device may be prevented from being selected.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-038353 filed Feb. 24, 2011, which is hereby incorporated by reference herein in its entirety.

What is claimed is:

1. An information processing apparatus comprising:
an acquisition unit configured to acquire a printer driver support function from a storage unit, and capability information corresponding to a print device selected on a print device selection screen, wherein, in a case that a connection between the information processing apparatus and the print device cannot be established and the capability corresponding to the print device cannot be acquired by the acquisition unit, the acquisition unit acquires a print setting included in a preset support function stored in a predetermined storage unit of the information processing apparatus in advance;
a generation unit configured to generate display target print setting information by adding a print medium information included in the capability information, that is information regarding a difference between the printer driver support function acquired by the acquisition unit and the capability information, to the printer driver support function, wherein, in a case that the print setting included in the preset support function is acquired by the acquisition unit, the generation unit substitutes the printer driver support function into the preset support function and generates the display target print setting information from the substituted printer driver support function;
a display unit configured to display the display target print setting information on which, in addition to a print setting information included in the printer driver support function, a print setting generated by the generation unit is displayed in a selective manner;
a control unit configured to control the print device to generate a first print data in a case that a print medium set via the display target print setting information displayed by the display unit is a print setting to be transmitted, and to generate a second print data and transmit the generated print data in a case that the print medium is a print setting to be applied.

2. The information processing apparatus according to claim 1, wherein the display unit displays an additional print setting screen for selecting the print medium based on the print medium information included in the capability information.

3. The information processing apparatus according to claim 1, wherein the printer driver support function is a class driver support function.

4. A control method for controlling an information processing apparatus, the method comprising:
acquiring, by an acquisition unit, a printer driver support function from a storage unit, and capability information corresponding to a print device selected on a print device selection screen, wherein, in a case that a connection between the information processing apparatus and the print device cannot be established and the capability corresponding to the print device cannot be acquired by the acquisition unit, the acquisition unit acquires a print setting included in a preset support function stored in a predetermined storage unit of the information processing apparatus in advance;
generating, by a generation unit, display target print setting information by adding a print medium information included in the capability information, that is information regarding a difference between the printer driver support function acquired by the acquisition unit and the capability information, to the printer driver support function, wherein, in a case that the print setting included in the preset support function is acquired by the acquisition unit, the generation unit substitutes the printer driver support function into the preset support function and generates the display target print setting information from the substituted printer driver support function;

displaying, by a display unit, the display target print setting information on which, in addition to a print setting information included in the printer driver support function, a print setting generated by the generation unit is displayed in a selective manner;

controlling the print device to generate a first print data in a case that a print medium set via the display target print setting information displayed by the display unit is a print setting to be transmitted, and to generate a second print data and transmit the generated print data in a case that the print medium is a print setting to be applied.

5. The control method according to claim 4, wherein the display unit displays an additional print setting screen for selecting the print medium based on the print medium information included in the capability information.

6. The control method according to claim 4, wherein the printer driver support function is a class driver support function.

7. A non-transitory storage medium that stores a computer-readable program for controlling an information processing apparatus, the method comprising:

acquiring, by an acquisition unit, a printer driver support function from a storage unit, and capability information corresponding to a print device selected on a print device selection screen, wherein, in a case that a connection between the information processing apparatus and the print device cannot be established and the capability corresponding to the print device cannot be acquired by the acquisition unit, the acquisition unit acquires a print setting included in a preset support function stored in a predetermined storage unit of the information processing apparatus in advance;

generating, by a generation unit, display target print setting information by adding a print medium information included in the capability information, that is information regarding a difference between the printer driver support function acquired by the acquisition unit and the capability information, to the printer driver support function, wherein, in a case that the print setting included in the preset support function is acquired by the acquisition unit, the generation unit substitutes the printer driver support function into the preset support function and generates the display target print setting information from the substituted printer driver support function;

displaying, by a display unit, the display target print setting information on which, in addition to a print setting information included in the printer driver support function, a print setting generated by the generation unit is displayed in a selective manner;

controlling the print device to generate a first print data in a case that a print medium set via the display target print setting information displayed by the display unit is a print setting to be transmitted, and to generate a second print data and transmit the generated print data in a case that the print medium is a print setting to be applied.

8. The non-transitory storage medium according to claim 7, wherein the display unit displays an additional print setting screen for selecting the print medium based on the print medium information included in the capability information.

9. The non-transitory storage medium according to claim 8, wherein the printer driver support function is a class driver support function.

* * * * *